United States Patent [19]

Seki et al.

[11] Patent Number: 5,175,407
[45] Date of Patent: Dec. 29, 1992

[54] NC DATA CREATION METHOD

[75] Inventors: Masaki Seki; Takashi Takegahara, both of Tokyo; Masatoshi Nakajima, Yamanashi, all of Japan

[73] Assignee: Fanuc Ltd, Minamitsuru, Japan

[21] Appl. No.: 427,109

[22] PCT Filed: Feb. 15, 1989

[86] PCT No.: PCT/JP89/00149

§ 371 Date: Oct. 12, 1989

§ 102(e) Date: Oct. 12, 1989

[87] PCT Pub. No.: WO89/07504

PCT Pub. Date: Aug. 24, 1989

[30] Foreign Application Priority Data

Feb. 15, 1988 [JP] Japan .................. 63-32055

[51] Int. Cl.$^5$ .......... B23H 7/06; B23H 7/20; B23Q 15/013; G05B 19/19
[52] U.S. Cl. .................. 219/69.12; 219/69.13; 318/570; 364/474.04; 364/474.22; 364/474.28
[58] Field of Search ........ 364/474.04, 474.22, 364/474.25, 474.26, 474.27, 474.31, 474.32, 474.18, 474.28, 474.29; 219/69.12, 69.13, 69.17, 69.16; 318/570, 573, 600

[56] References Cited

U.S. PATENT DOCUMENTS

| 3,891,819 | 6/1975 | Ullmann et al. | 219/69.12 |
| 4,314,133 | 2/1982 | Pfau et al. | 219/69.12 |
| 4,544,819 | 10/1985 | Nomura et al. | 219/69.12 |
| 4,739,489 | 4/1988 | Kishi et al. | 364/474.29 |
| 4,746,782 | 5/1988 | Weber | 219/69.12 |
| 4,820,894 | 4/1989 | Francois et al. | 219/69.12 |
| 4,891,763 | 2/1990 | Kuriyama | 364/474.26 |
| 5,043,550 | 8/1991 | Sakaue | 219/69.12 |

FOREIGN PATENT DOCUMENTS

| 56-39825 | 4/1981 | Japan | 219/69.12 |
| 102426 | 8/1981 | Japan . | |
| 186528 | 10/1983 | Japan . | |
| 59-227330 | 12/1984 | Japan | 219/69.12 |
| 127922 | 7/1985 | Japan | 219/69.13 |
| 297022 | 12/1986 | Japan | 219/69.13 |
| 297024 | 12/1986 | Japan | 219/69.13 |
| 62-69301 | 3/1987 | Japan . | |
| 63-244111 | 10/1988 | Japan | 364/474.32 |

Primary Examiner—Geoffrey S. Evans
Attorney, Agent, or Firm—Staas & Halsey

[57] ABSTRACT

A prompt (MEQ) which indicates whether a machining end-point is (i) a point which coincides with a machining starting point, (ii) a point a predetermined amount $\Delta\alpha$ past the machining starting point, or (iii) a point a predetermined amount $\Delta\alpha$ short of the machining starting point is included on a dialog screen (DIM) and machining end-point information is entered from a keyboard (12). In response, a processor (11a) of a system main body (11) automatically computes coordinates of the machining from the machining end-point information, the machining starting point and path data, and creates NC data for arriving at the machining end-point along a path specified by the path data.

10 Claims, 9 Drawing Sheets

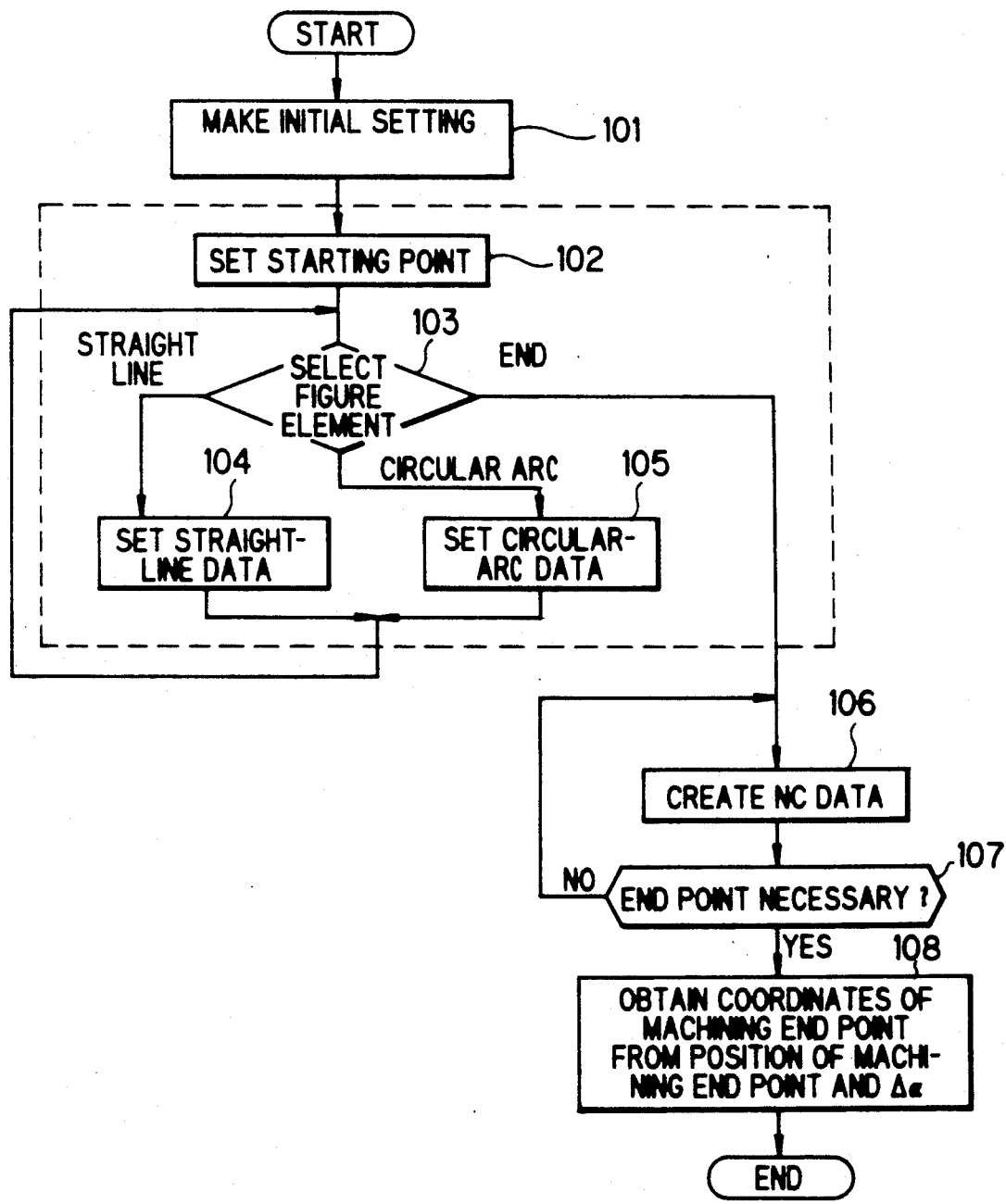

FIG. 3(a)

* INITIAL SETTINGS *

```
COMMENTS.............CM= □□□□□□□□□□
MACHINING LIMITS..XMIN= □□□.□□□
                  YMIN= □□□.□□□
                  XMAX= □□□.□□□
                  YMAX= □□□.□□□
WIRE CONNECTING METHOD..MD= □□□□□□□□□□
APPROACH/WITHDRAWAL AMOUNT..AM= □□□.□□□
APPROACH/WITHDRAWAL ANGLE....AA= □□□.□□□
MACHINING END POSITION......EP= □□□□□□□□□□
M-CODE AT END..............EM= □□□□
```

CM= □□□   QAR

FIG. 3(b)   MEQ

MACHINING END POSITION
1: ON STARTING POINT   2: PAST   3: JUST SHORT

FIG. 8

\*\*\*ANY FIGURE\*\*\*

STARTING XMS☐☐☐☐.☐☐☐  YMS☐☐☐☐.☐☐☐ (END POINT OF PRECEDING ELEMENT)
POINT

FIGURE FOR DESCRIBING ELEMENT

END POINT ........... XE= ☐☐☐☐.☐☐☐
                      YB= ☐☐☐☐.☐☐☐
DISTANCE ............ D = ☐☐☐☐.☐☐☐
INCLINATION ANGLE ... A = ☐☐☐☐.☐☐☐
CORNER R ............ R = ☐☐☐☐.☐☐☐
CHAMFER ............. C = ☐☐☐☐.☐☐☐
TAPER ANGLE ......... T = ☐☐☐☐.☐☐☐

XE=
1: DEFINITION OF POINT   2:   3:   4:   5:

FIG. 9

*ANY FIGURE*

STARTING POINT   XMS ▢▢▢▢.▢▢▢   YMS▢▢▢▢.▢▢▢ (END POINT OF PRECEDING ELEMENT)

END POINT ........ XE= ▢▢▢▢.▢▢▢
                   YB= ▢▢▢▢.▢▢▢
DIRECTION OF ROTATION.DR= ▢▢▢▢▢▢▢▢▢▢
ROTATIONAL ANGLE ... A = ▢▢▢▢.▢▢▢
CENTER POINT ..... XC= ▢▢▢▢.▢▢▢
                   YC= ▢▢▢▢.▢▢▢
RADIUS ........... R = ▢▢▢▢.▢▢▢
CORNER R ......... R = ▢▢▢▢.▢▢▢
CHAMFER .......... C = ▢▢▢▢.▢▢▢
TAPER ANGLE ...... T = ▢▢▢▢.▢▢▢

XE=
1: DEFINITION OF POINT   2:   3:   4:   5:

NC DATA CREATION METHOD

BACKGROUND OF THE INVENTION a. Field of the Invention

This invention relates to an NC data creation method for automatically creating NC data for wire-cut electrical discharge machining.

b. Description of the Related Art

In wire-cut electrical discharge machining, a blank is formed with a machining starting hole in advance, and a wire is stretched so as to be capable of passing through the hole and paid out. The blank is adapted so as to be capable of being moved relative to the wire. An electrical discharge is produced by applying a high voltage across the wire and the blank while the aforementioned relative movement is taking place, and the blank is machined by the energy of the electrical discharge.

In creating the NC data for such wire-cut electrical discharge machining, the machining starting point of a part profile, the part profile data (path data) and the machining end point must be specified in addition to various auxiliary information (approach method, withdrawal method, wire severing method, etc.).

To accomplish this, the conventional practice is to directly enter, by means of a keyboard or the like, the coordinates of the machining starting point, the coordinates of the machining end point, and path data including the type of path (straight line or circular arc) and path end point in each path block.

Although the machining starting point and the part profile (path data) can be readily grasped from a design drawing of the part, the machining end point cannot be determined from the design drawing. Accordingly, each machining end point is manually computed, the coordinates thereof found and then entered.

As shown in FIG. 10, a machining end point $M_E$ can be (i) a point which coincides with a machining starting point $M_S$ [see FIG. 10(a)];

(ii) a point obtained by moving past the machining starting point $M_S$ by a predetermined amount $\Delta a$ [see FIG. 10(b)]; or (iii) a point short of the machining starting point $M_S$ by a predetermined amount $\Delta a$ [see FIG. 10(c)].

In FIG. 10, PT represents a wire electrode path, and H denotes a machining starting hole. The wire path patterns in FIGS. 10(a), (b) and (c) are indicated by the solid lines in FIGS. 10(d), (e) and (f), respectively.

In the case of (i), the coordinates of the machining end point $M_E$ can be obtained in a simple manner since the machining starting point $M_S$ and machining end point $M_E$ coincide. In the cases of (ii) and (iii), however, the coordinates of the machining end point must be found by a manual calculation based on using the predetermined amount $\Delta a$ and the path data. Calculating the coordinates is very troublesome, especially when the machining end point $M_E$ resides on a circular arc.

Accordingly, an object of the present invention is to provide an NC data creation method for wire-cut electrical discharge machining, in which the coordinates of the machining end points need not be manually calculated and entered each time.

SUMMARY OF THE INVENTION

The method of the invention includes entering machining end-point information which indicates whether a machining end point is (i) a point which coincides with a machining starting point, (ii) a point a predetermined amount past the machining starting point, or (iii) a point a predetermined amount short of the machining starting point; computing coordinates of the machining end point from the machining end-point information, separately entered coordinates of the machining starting point and the path data; and creating NC data for arriving at the machining end point along a path specified by the path data.

In accordance with this method, there can be provided an NC data creation method in which it is unnecessary to manually calculate and enter the coordinates of the machining end point. As a result, operability of electrical discharge machining devices is improved, and the machining end points can be entered without error.

BRIEF DESCRIPTION OF THE DRAWINGS

FIG. 2 is a flowchart of processing according to the invention;

FIGS. 3(a) and 3(b) are dialog screens illustrating an initial setting screen;

FIG. 8 is a dialog screen illustrating the setting of a straight-line;

FIG. 9 is a dialog screen illustrating the setting of an arc; and

DESCRIPTION OF THE PREFERRED EMBODIMENT

Figure 1:
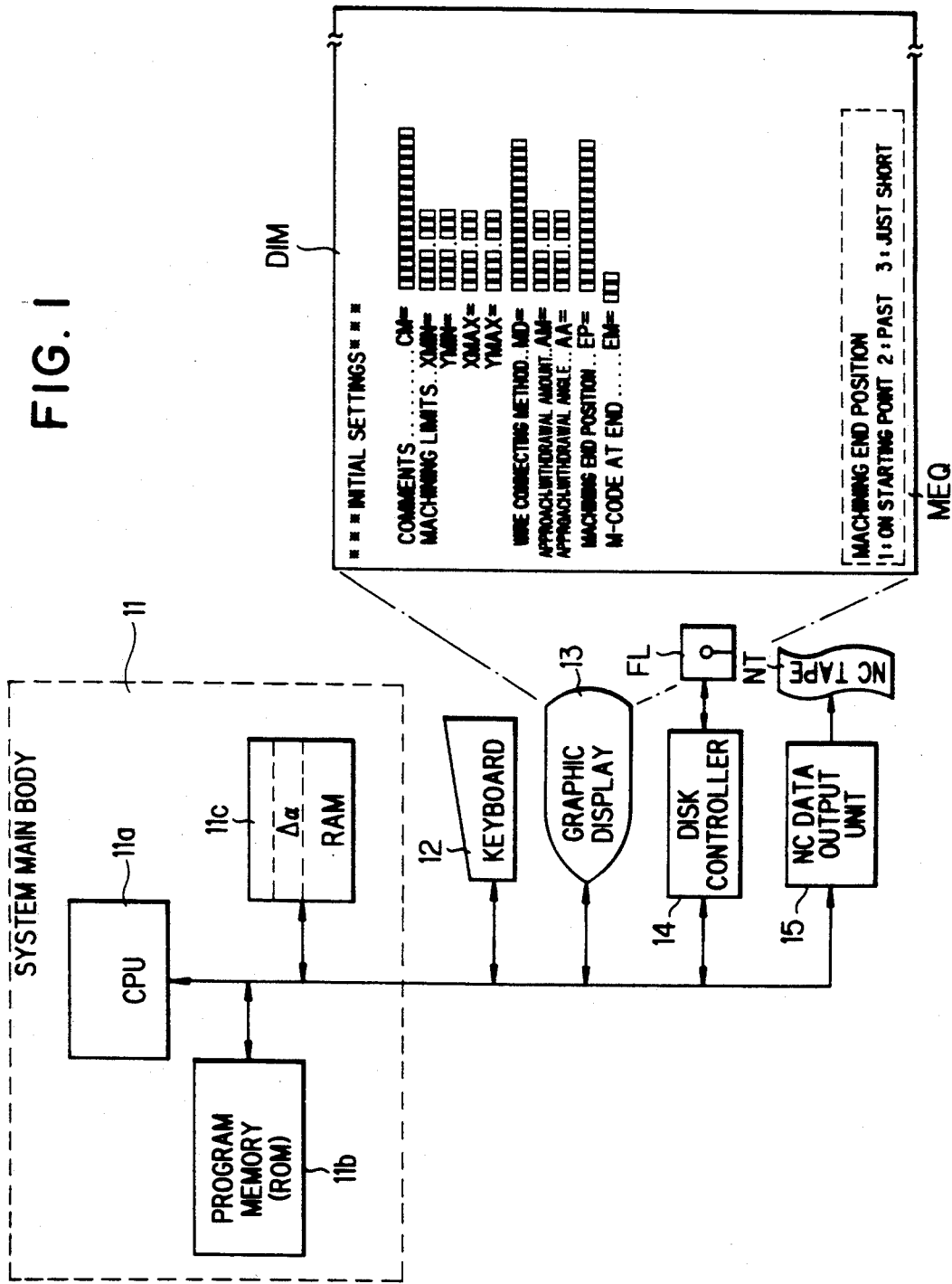
FIG. 1 is a block diagram of an automatic programming system for practicing the method of the invention.

FIG. 1 is a block diagram of an automatic programming system for practicing the NC data creation method for wire-cut electical discharge machining according to the invention.

Reference numeral 11 denotes the main body of the system, in which 11a designates a processor (CPU), 11b designates a read only memory (ROM) storing a loading program and the like, and 11c designates a random access memory (RAM) which stores a system program read in from a floppy FL for the purpose of creating NC data, various parameters e.g., the predetermined distance $\Delta a$), and the results of processing. In the case where the machining end point is past the machining starting point or short of the machining end point, the parameter $\Delta a$ represents the distance between the two points [see FIGS. 10(b) and (c)].

Reference numeral 12 denotes a keyboard, 13 denotes a graphic display unit, 14 denotes a disk controller, and 15 denotes an NC data output unit for outputting created NC data to an external storage medium, such as NC tape NT. The floppy FL stores the system program for storing NC data as well as parameters and the like.

FIG. 2 is a flowchart illustrating the processing according to the present invention, and FIGS. 3 through 9 are examples of dialog screens, utilized in the processing. Processing according to the invention will now be described in accordance with FIGS. 1 through 9. It should be noted that the system program, the parameter ($\Delta a$) and the like are assumed to have already been read into the RAM from the floppy FL.

Figure 10A:
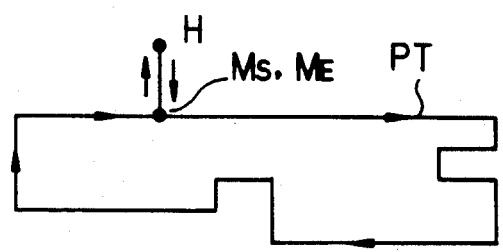
FIGS. 10(a) and 10(b) are views describing the positions of machining end points.
Figure 10D:
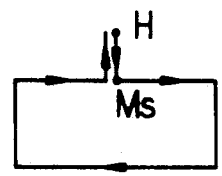
Figure 10B:
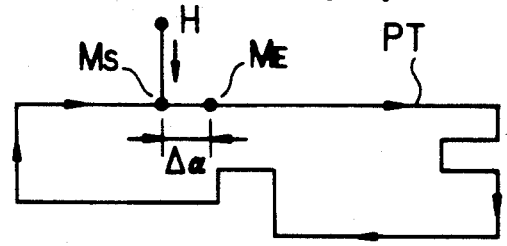
Figure 10E:
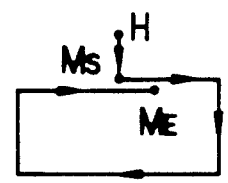
Figure 10C:
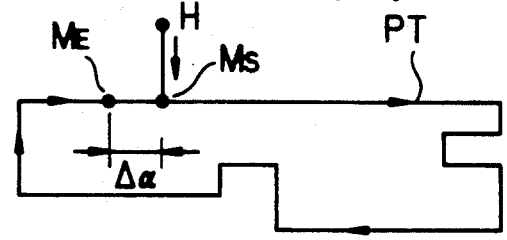
Figure 10F:
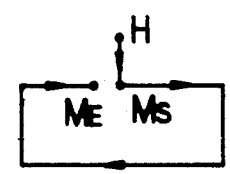

When the system for creating NC data for wire-cut electrical discharge machining is started, the processor 11a causes an initial setting dialog screen shown in FIG. 3(a) to be displayed on the graphic display unit 13. In response to the prompts, a comment CM, machining limits, wire severing method, and auxiliary information such as approach and withdrawal amount and approach and withdrawal angle are all entered successively in a prompt area QAR. At the moment the above-mentioned auxiliary information is entered, a prompt MEQ shown in FIG. 3(b) is displayed in the prompt area, in response to which the operator enters machining end-point information. Specifically, machining end-point information is entered indicating whether the machining end point is (i) a point which coincides with the machining starting point [FIG. 10(a)];

(ii) a point obtained by moving past the machining starting point by a predetermined amount $\Delta\alpha$ [FIG. 10(b)]; or (iii) a point short of the machining starting point by the predetermined amount $\Delta\alpha$ [FIG. 10(c)].

The foregoing corresponds to step 101 of the flowchart in FIG. 2.

Figure 4:
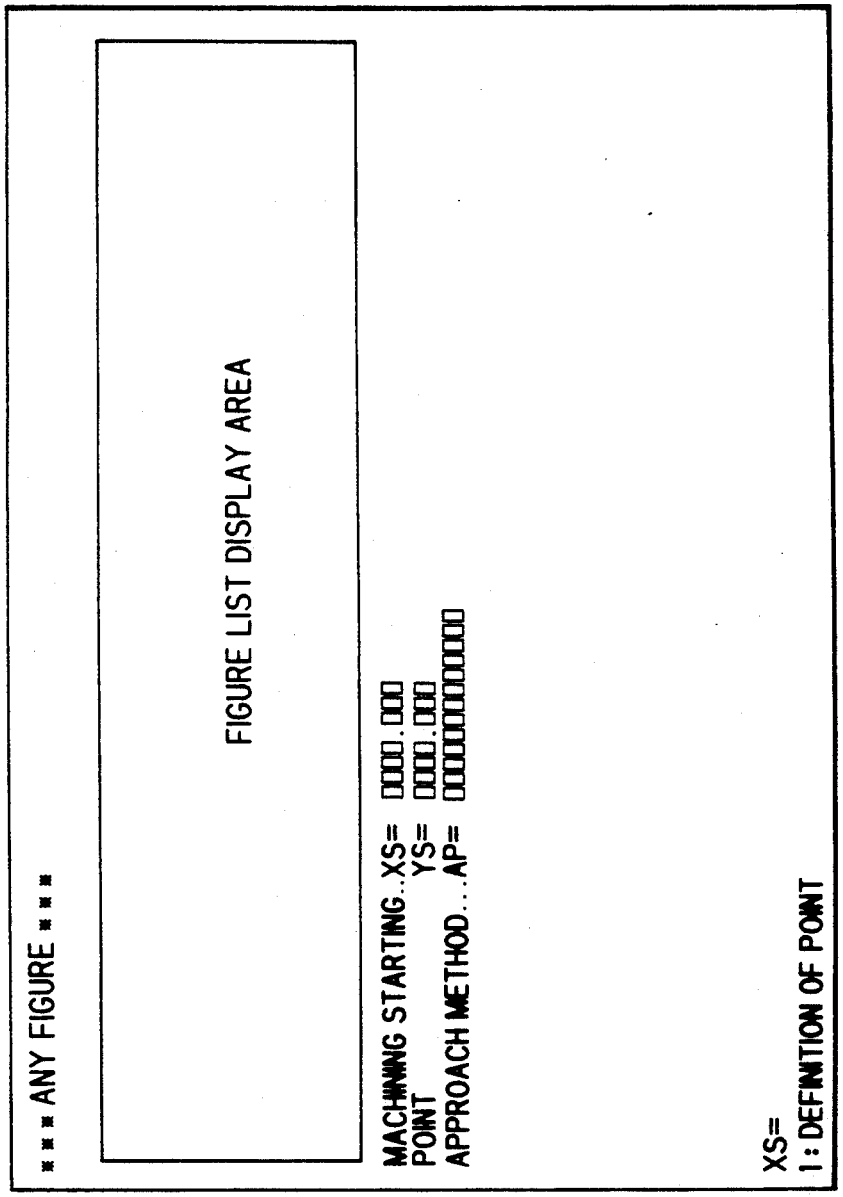
FIG. 4 is a dialog screen illustrating the setting of a machining starting-point.

After the initial settings have been made, a part profile input screen (a screen for any figure) shown in FIG. 4 is displayed. Then coordinates XS, YS of the machining starting point as well as the approach method are entered (step 102).

Figure 5:
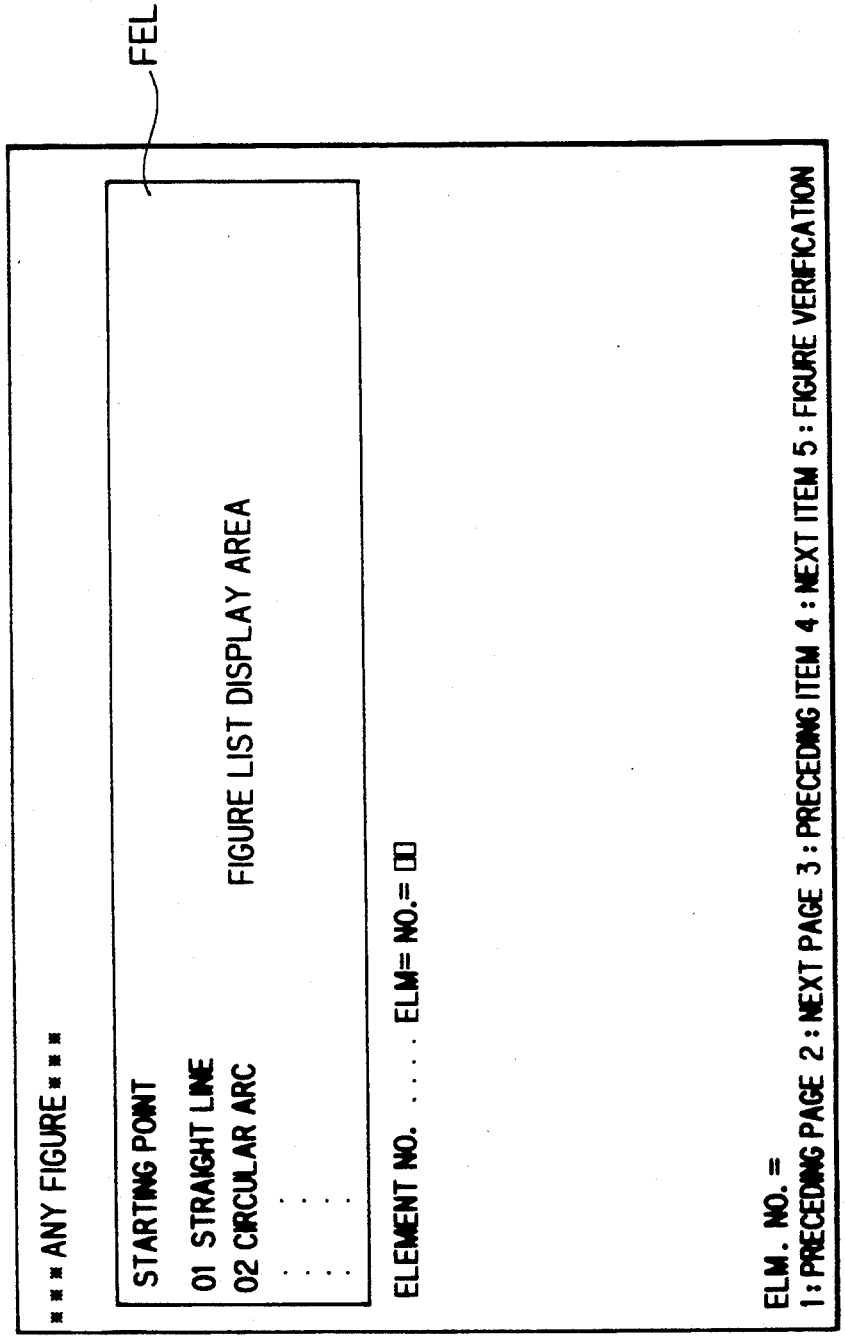
FIGS. 5 through 7 are dialog screens illustrating the setting of a figure element.

When entry of the coordinates of the machining starting point is complete the processor 11a displays the screen for any figure shown in FIG. 5. Namely the part profile input screen is displayed on the display unit 13. In FIG. 5, FEL represents a "FIGURE LIST DISPLAY AREA" which displays element numbers in the order entered as well as the type of figure element (straight line, circular arc, etc.).

Figure 6:
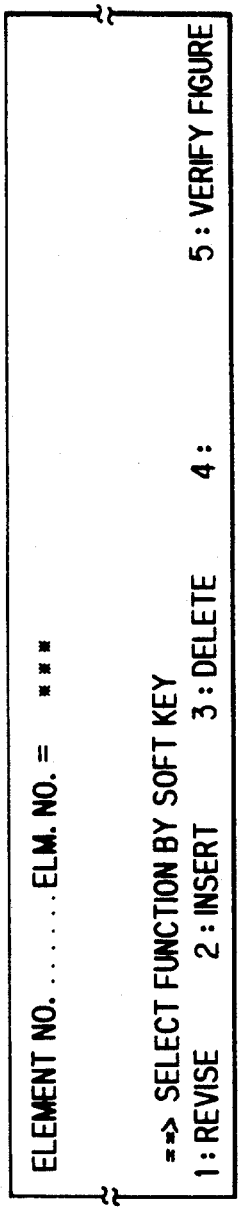

When an element number is entered on the dialog screen of FIG. 5, the processor causes the prompts shown in FIG. 6 to be displayed below the "FIGURE LIST DISPLAY AREA" FEL. If add or revise is selected and entered on this dialog screen, then a dialog screen inquiring with regard to the type of figure element or whether figure input has ended is displayed, as shown in FIG. 7.

Figure 7:
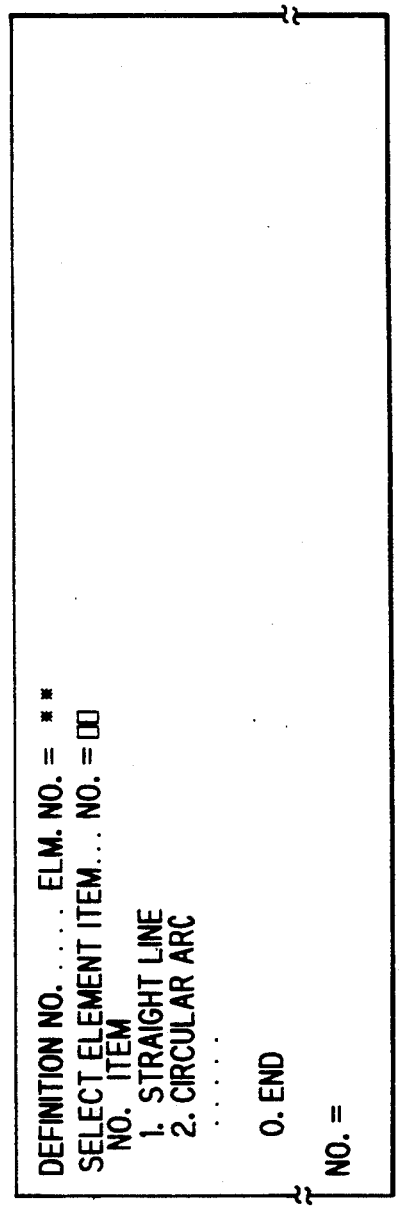

The type of figure element (straight line or circular arc) or "END" is entered on the dialog screen shown in FIG. 7.

The foregoing corresponds step 103 of the in FIG. 2 flowchart.

When the straight line is selected and entered, the processor 11a causes a dialog screen for specifying the straight line to be displayed, as shown in FIG. 8, in response to which data specifying the straight line are entered (step 104). When the circular arc is selected and entered, the processor 11a causes a dialog screen for specifying the circular arc to be displayed, as shown in FIG. 9, in response to which data specifying the circular arc are entered (step 105). Thereafter, processing from step 103 onward is repeated until the entire part profile has been entered.

When input of the part profile ends and "END" is selected and entered, the processor 11a creates NC data for wire-cut electrical discharge machining one block at a time using the entered data (step 106). When creation of NC data up to a block which is one block prior to the last block is completed and the coordinates of the machining end point become necessary, the processor automatically computes the coordinates $(X_E, Y_E)$ of the machining end point using the machining end-point information entered at step 101, the preset parameter $\Delta\alpha$ and the path data, creates NC data for moving the wire up to the machining end point, and then terminates processing (steps 107, 108).

Thus, in accordance with the present invention as set forth above, it is arranged to enter machining end-point information which indicates whether a machining end point is (i) a point which coincides with a machining starting point, (ii) a point a predetermined amount past the machining starting point, or (iii) a point a predetermined amount short of the machining starting point; compute coordinates of the machining end point from the machining end-point information, separately entered coordinates of the machining starting point and path data; and create NC data for arriving at the machining end-point along a path specified by the path data. Accordingly, there can be provided an NC data creation method in which it is unnecessary to manually calculate and enter the coordinates of the machining end-point. As a result, operability is improved and the machining end-points can be entered without error.

The many features and advantages of the invention are apparent from the detailed specification and thus it is intended by the appended claims to cover all such features and advantages of the invention which fall within the true spirit and scope of thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. An NC data creation method for automatically creating NC data for wire-cut electrical discharge machining, comprising the steps of:

(a) presetting a predetermined amount;

(b) entering machining end-point information indicating that a machining end-point is one of a point which coincides with a machining starting point, a point causing machining to continue the predetermined amount past the machining starting point, and a point causing machining to stop the predetermined amount short of the machining starting point;

(c) centering coordinates of the machining starting point;

(d) entering path data for specifying a part profile;

(e) computing coordinates of the machining end-point from the machining end-point information, the machining starting point and the path data; and (f) creating the NC data for arriving at the machining end-point along a substantially closed loop path specified by the path data.

2. An NC data creation method according to claim 1, wherein the predetermined amount is preset as a parameter.

3. An NC data creation method according to claim 1, wherein said method further comprises the step of (g) machining in accordance with the NC data created in step (f).

4. A method for automatically creating numerical control data for machining an object, the numerical control data being associated with a machining start point, path data and a machining end point, said method comprising the steps of:

(a) inputting machining start point coordinates, machining end point information and the path data;
(b) computing coordinates of the machining end point based on the machining end point information, the machining start point coordinates, and the path data; and
(c) creating the numerical control data for machining the object from the machining start point along a substantially closed loop path designated by the path data to the machining end point.

5. A method according to claim 4, wherein said method further comprises the step of (d) machining the object in accordance with the numerical control data created in step (c).

6. A method according to claim 4, wherein the machining end point information input in step (a) indicates type of machining end point as one of a first end point type causing machining to continue a first predetermined amount past the machining start point and a second end point type causing machining to stop a second predetermined amount before returning to the machining start point.

7. A method according to claim 6, wherein said method further comprises the step of (d) machining the object in accordance with the numerical control data created in step (c).

8. A system for automatically creating numerical control data for machining an object, the numerical control data associated with a machining start point, path data and a machining end point, said system comprising:

memory storage means for storing at least a predetermined distance representing a distance between the machining start point and the machining end point;

input means for inputting machining start point coordinates, machining end point information and the path data; and processing means for controlling creation of the numerical control data, said processing means including means for computing coordinates of the machining end point based on the machining end point information, the machining start point coordinates, the predetermined distance, and the path data; and means for creating the numerical control data for machining the object from the machining start point along a substantially closed loop path designated by the path data to the machining end point.

9. A system according to claim 8, wherein said system further comprises display means for displaying messages for prompting input of at least the machining end point information.

10. A system according to claim 9, wherein the machining end point information indicates type of machining end point as one of a first end point type causing machining to continue the predetermined distance past the machining start point and a second end point type causing machining to stop the predetermined distance before the machining start point.

* * * * *